United States Patent
Nonaka

(10) Patent No.: US 9,886,947 B2
(45) Date of Patent: Feb. 6, 2018

(54) SPEECH RECOGNITION DEVICE AND METHOD, AND SEMICONDUCTOR INTEGRATED CIRCUIT DEVICE

(71) Applicant: SEIKO EPSON CORPORATION, Tokyo (JP)

(72) Inventor: Tsutomu Nonaka, Hino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 243 days.

(21) Appl. No.: 14/180,672

(22) Filed: Feb. 14, 2014

(65) Prior Publication Data

US 2014/0244255 A1 Aug. 28, 2014

(30) Foreign Application Priority Data

Feb. 25, 2013 (JP) .................................. 2013-034257
Mar. 5, 2013 (JP) .................................. 2013-042664

(51) Int. Cl.
*G10L 15/08* (2006.01)
*G10L 15/06* (2013.01)
(Continued)

(52) U.S. Cl.
CPC .............. *G10L 15/08* (2013.01); *G10L 13/00* (2013.01); *G10L 2015/025* (2013.01);
(Continued)

(58) Field of Classification Search
CPC ... G10L 13/00; G10L 15/08; G10L 2015/025; G10L 2015/027; G10L 2015/0635; G10L 2015/085; G10L 2015/223
(Continued)

(56) References Cited

U.S. PATENT DOCUMENTS 7,313,524 B1 12/2007 Minamino
8,775,177 B1 * 7/2014 Heigold .................. G10L 15/10
379/88.22
(Continued)

FOREIGN PATENT DOCUMENTS

JP H02-106800 A 4/1990
JP H03-231297 A 10/1991
(Continued)

OTHER PUBLICATIONS

Kojima et al; "Ultra-Rapid Speech Recognition based on Search Termination using Confidence Scoring;" Department of Computer Science and Engineering, Nagoya Institute of Technology; 2009; pp. 13-18.

*Primary Examiner* — Houshang Safaipour
*Assistant Examiner* — Bharatkumar S Shah
(74) *Attorney, Agent, or Firm* — Oliff PLC

(57) ABSTRACT

A semiconductor integrated circuit device for speech recognition includes a conversion candidate setting unit that receives text data indicating words or sentences together with a command and sets the text data in a conversion list in accordance with the command; a standard pattern extracting unit that extracts, from a speech recognition database, a standard pattern corresponding to at least a part of the words or sentences indicated by the text data that is set in the conversion list; a signal processing unit that extracts frequency components of an input speech signal and generates a feature pattern indicating distribution of the frequency components; and a match detecting unit that detects a match between the feature pattern generated from at least a part of the speech signal and the standard pattern and outputs a speech recognition result.

24 Claims, 5 Drawing Sheets

(51) Int. Cl.
  *G10L 15/02*   (2006.01)
  *G10L 13/00*   (2006.01)
  *G10L 15/22*   (2006.01)

(52) U.S. Cl.
  CPC   *G10L 2015/027* (2013.01); *G10L 2015/0635* (2013.01); *G10L 2015/085* (2013.01); *G10L 2015/223* (2013.01)

(58) Field of Classification Search
  USPC ........................................................ 704/244
  See application file for complete search history.

(56) References Cited

U.S. PATENT DOCUMENTS

| | | | |
|---|---|---|---|
| 9,159,319 B1* | 10/2015 | Hoffmeister | G10L 15/08 |
| 2005/0004788 A1* | 1/2005 | Lee | G06F 3/038 |
| | | | 703/22 |
| 2008/0120106 A1 | 5/2008 | Izumida et al. | |
| 2008/0167860 A1* | 7/2008 | Goller | G10L 15/28 |
| | | | 704/201 |
| 2008/0177541 A1* | 7/2008 | Satomura | 704/251 |

FOREIGN PATENT DOCUMENTS

| | | |
|---|---|---|
| JP | H09-311694 A | 12/1997 |
| JP | A-2001-154685 | 6/2001 |
| JP | A-2002-182687 | 6/2002 |
| JP | A-2005-85433 | 3/2005 |
| JP | A-2008-15209 | 1/2008 |
| JP | A-2008-64885 | 3/2008 |
| JP | 2008-129412 A | 6/2008 |
| JP | A-2011-39202 | 2/2011 |

\* cited by examiner

Conversion list A

| Number | Japanese | Romanization |
|---|---|---|
| 0011 | soba | soba |
| 0012 | udon | udon |
| 0013 | kareh | kareh |
| 0014 | katsudon | katudoN |
| ⋮ | ⋮ | ⋮ |

FIG. 5

Conversion list B

| Number | Japanese | Romanization |
|---|---|---|
| 0021 | hitotsu | hitotu |
| 0022 | hutatsu | hutatu |
| 0023 | mittsu | mittu |
| ⋮ | ⋮ | ⋮ |

FIG. 6

SPEECH RECOGNITION DEVICE AND METHOD, AND SEMICONDUCTOR INTEGRATED CIRCUIT DEVICE

CROSS-REFERENCE TO RELATED APPLICATIONS

This application claims priority to Japanese Patent Applications No. 2013-034257 filed on Feb. 25, 2013 and No. 2013-042664 filed on Mar. 5, 2013.

The entire disclosure of Japanese Patent Applications No. 2013-034257 and No. 2013-042664 is hereby incorporated herein by reference.

BACKGROUND

1. Technical Field

The present invention relates to a speech recognition device and a speech recognition method that are for recognizing speech and providing a response or performing processing in accordance with the recognition result, as part of human interface technology applied to vending machines, home electrical appliances, household fixtures, in-vehicle devices (navigation devices and the like), mobile terminals, and the like. Furthermore, the invention relates to a semiconductor integrated circuit device or the like for use in such a speech recognition device.

2. Related Art

Speech recognition is a technology of analyzing an input speech signal, checking a feature pattern that is obtained as a result of the analysis against a standard pattern (also referred to as "template") that is prepared in a speech recognition database on the basis of a pre-recorded speech signal, and thereby obtaining a recognition result. However, if no restrictions are imposed on the range of standard patterns to be checked against, the number of combinations of the feature pattern and standard patterns to be compared will be huge. Thus, it takes much time to obtain a recognition result, and the recognition rate tends to be low because the number of words or sentences that have similar standard patterns also increases.

As an example of related art, JP-A-2005-85433 (Abstract) discloses a playback device that is designed to enable designation of a content to be played, such as a music track, by voice without the need for advance preparation or a large/expansive dictionary. This playback device loads title data contained in TOC data stored in a CD, converts the title data into the same format that the speech recognition results will be in, and retains the converted data as candidate data. When a title of a track is input by voice, the playback device performs speech recognition processing, compares the speech recognition result with the candidate data, and plays the track corresponding to the highest matching candidate data. Consequently, the track that should be played can be designated by the user's voice, and thus the number of user operations, such as display confirmations and button operations, is reduced.

According to the playback device disclosed in JP-A-2005-85433 (Abstract), options in speech recognition are limited to those tracks that are stored in the CD, and the title data, which is text information, is converted into candidate data in the same format as the speech recognition results. However, the processing load for converting text information such as title data into candidate data is considerable, and it is difficult for devices that perform a wide variety of information processing, typified by navigation devices, to quickly perform operations associated with this conversion processing, such as creation or updating of a speech recognition dictionary, in parallel with other information processing that was already being performed. For this reason, a problem arises in that the speech recognition processing is prolonged.

JP-A-2011-39202 (paragraphs 0004 to 0010) discloses an in-vehicle information processing device that is designed to enable speech recognition to be performed during updating of a speech recognition dictionary that is used for speech recognition. This in-vehicle information processing device includes a connecting unit to which an information terminal having information data and attribute data containing identification information for specifying that information data is connected, a speech recognition dictionary creating unit that creates a speech recognition dictionary by acquiring the attribute data in the information terminal, converting a part of that attribute data into speech recognition information, and associating the speech recognition information with the identification information, a dictionary storing unit that stores the created speech recognition dictionary, a speech recognition processing unit that performs speech recognition processing of processing input speech and detecting the identification information associated with the speech recognition information corresponding to that speech from the speech recognition dictionary, and an information data acquiring unit that, as a result of the detected identification information being set therein, acquires the information data in the information terminal on the basis of that identification information. The in-vehicle information processing device outputs information that is based on the acquired information data.

The in-vehicle information processing device disclosed in JP-A-2011-39202 (paragraphs 0004 to 0010) includes a judgement unit that, when the speech recognition dictionary creating unit is in the process of creating a speech recognition dictionary, causes speech recognition processing to be performed with a speech recognition dictionary stored in the dictionary storing unit and judges whether or not identification information that is detected by that speech recognition processing matches the identification information in the information terminal. The identification information to be set in the information data acquiring unit is changed depending on whether or not they match, resulting in different information data being acquired. However, there are cases where, after new attribute data has been acquired, a favorable speech recognition result cannot be obtained even if speech recognition processing is performed with an unupdated speech recognition dictionary that is stored in the dictionary storing unit.

Moreover, in speech recognition, the degree of exactness or fuzziness with respect to recognition accuracy that is required when a word or sentence is to be recognized on the basis of a speech signal is set constant irrespective of the number of words or sentences having similar display patterns.

As an example of related art, JP-A-2008-64885 (paragraphs 0006 to 0010) discloses a speech recognition device that is designed to recognize a user's speech accurately even if the user's speech is ambiguous. This speech recognition device determines a control content of a control object on the basis of a recognition result regarding input speech and includes a task type determination unit that determines a task type indicating the control content on the basis of a given determination input and a speech recognition unit that recognizes the input speech using a task of the type that is determined by the task type determination unit as a judgement object.

According to the speech recognition device disclosed in JP-A-2008-64885 (paragraphs 0006 to 0010), when user's words are favorably recognized on the basis of a speech signal, even if what is to be controlled is not specified in the user's words, the control content of the control object can be determined by limiting the recognition object in accordance with an indication of how the control object is to be controlled. However, the degree of exactness or fuzziness with respect to the recognition accuracy that is required when user's words are to be recognized on the basis of a speech signal is set constant, and the recognition rate of speech recognition cannot be improved.

Generally, option information for use in speech recognition is contained in a speech recognition dictionary, but updating of the speech recognition dictionary takes time, and thus it has been difficult to update the option information during execution of speech recognition processing. For example, in the case where a plurality of questions are asked to judge a speaker's purpose from replies to the respective questions, even though speech recognition scenarios in which the plurality of questions and a plurality of options for those questions are set are prepared, it has been difficult to change option information indicating a plurality of options for a plurality of questions that follow a great number of scenarios. Thus, an advantage of some aspects of the invention is to facilitate updating of the option information in speech recognition, thereby appropriately restricting the range of the option information and improving the recognition rate, or enabling a deep speech recognition hierarchical menu to be handled.

As described above, in speech recognition, the degree of exactness or fuzziness with respect to the recognition accuracy that is required when a word or a sentence is recognized on the basis of a speech signal is set constant irrespective of the number of words or sentences that have similar display patterns. For this reason, speech recognition is performed under the same recognition conditions in both cases where the number of options is large and where it is small or in both cases where the options include a large number of similar words and where they include a small number of similar words. Thus, there has been a problem in that the recognition rate of speech recognition does not improve.

SUMMARY

An advantage of some aspects of the invention is to appropriately restrict the number of options in speech recognition and change the degree of exactness or fuzziness with respect to the recognition accuracy that is required in speech recognition depending on the options, thereby improving the recognition rate of speech recognition. The invention was accomplished to solve at least one of the above-described issues or problems.

A semiconductor integrated circuit device according to a first aspect of the invention includes a speech recognition database storing unit that stores a speech recognition database containing standard patterns indicating distribution of frequency components of a plurality of phonemes that are used in a predetermined language, a conversion candidate setting unit that receives text data indicating words or sentences together with a command, and sets the text data in a conversion list in accordance with the command, a conversion list storing unit that stores the conversion list, a standard pattern extracting unit that extracts, from the speech recognition database, a standard pattern corresponding to at least a part of the words or sentences indicated by the text data that is set in the conversion list, a signal processing unit that extracts frequency components of an input speech signal by computing a Fourier transform of the speech signal and generates a feature pattern indicating distribution of the frequency components of the speech signal, and a match detecting unit that detects a match between the feature pattern generated from at least a part of the speech signal and the standard pattern extracted from the speech recognition database, and outputs a speech recognition result that specifies a word or sentence with respect to which a match is detected out of a plurality of words or sentences constituting conversion candidates.

Moreover, a speech recognition device according to a first aspect of the invention includes the semiconductor integrated circuit device according to the first aspect of the invention and a control unit that sends the text data indicating the words or sentences to the semiconductor integrated circuit device together with the command.

Furthermore, a method for speech recognition according to the first aspect of the invention includes (a) receiving text data indicating words or sentences together with a command and setting the text data in a conversion list in accordance with the command, (b) extracting, from a speech recognition database containing standard patterns indicating distribution of frequency components of a plurality of phonemes that are used in a predetermined language, a standard pattern corresponding to at least a part of the words or sentences indicated by the text data that is set in the conversion list, (c) extracting frequency components of an input speech signal by computing a Fourier transform of the speech signal and generating a feature pattern indicating distribution of the frequency components of the speech signal, and (d) detecting a match between the feature pattern generated from at least a part of the speech signal and the standard pattern extracted from the speech recognition database, and outputting a speech recognition result that specifies a word or sentence with respect to which a match is detected out of a plurality of words or sentences constituting conversion candidates.

According to the first aspect of the invention, since the text data is set in the conversion list in accordance with the received command, and a standard pattern corresponding to at least a part of the words or sentences indicated by the text data that is set in the conversion list is extracted from the speech recognition database, updating of the option information in speech recognition is facilitated. As a result, it is possible to improve the recognition rate by appropriately restricting the range of the option information or to handle a deep speech recognition hierarchical menu.

A semiconductor integrated circuit device according to a second aspect of the invention further includes a speech signal synthesizing unit that receives response data indicating a response content with respect to the speech recognition result and synthesizes an output speech signal on the basis of the response data. Thus, it is possible to create a situation in which a user's reply to the question or message that is emitted on the basis of the response data is expected to be one of a number of words or sentences.

A speech recognition device according to the second aspect of the invention includes the semiconductor integrated circuit device according to the second aspect of the invention and a control unit that receives the speech recognition result and sends the response data and the text data indicating the words or sentences to the semiconductor integrated circuit device together with the command. Thus, the text data indicating the plurality of words or sentences corresponding to the question or message that is emitted on the basis of the response data can be set in the conversion list.

In a semiconductor integrated circuit device according to a third aspect of the invention, when a level of the speech signal exceeds a predetermined value, the signal processing unit activates a speech detection signal. Thus, it is possible to judge whether or not there is a request or reply from the user.

A speech recognition device according to the third aspect of the invention includes the semiconductor integrated circuit device according to the third aspect of the invention and a control unit that, if a speech recognition result indicating a match between the feature pattern and the standard pattern is not obtained within a predetermined period of time after activation of the speech detection signal, sends text data to be added to the conversion list to the semiconductor integrated circuit device together with the command and controls the semiconductor integrated circuit device so that match detection is performed. Thus, if the speech recognition result indicating a match between the feature pattern and the standard pattern is not obtained within the predetermined period of time, it is possible to perform match detection again after adding an option.

A semiconductor integrated circuit device according to a fourth aspect of the invention includes a speech recognition database storing unit that stores a speech recognition database containing standard patterns indicating distribution of frequency components of a plurality of phonemes that are used in a predetermined language, a conversion information setting unit that receives text data indicating words or sentences constituting conversion candidates and a recognition accuracy parameter indicating the degree of exactness with respect to recognition accuracy that is applied when the words or sentences constituting the conversion candidates are recognized, and sets the text data in a conversion list in accordance with the command, a conversion list storing unit that stores the conversion list, a standard pattern extracting unit that extracts, from the speech recognition database, a standard pattern corresponding to at least a part of the words or sentences indicated by the text data that is set in the conversion list, a recognition accuracy adjustment unit that adjusts a range of spread of the standard pattern extracted from the speech recognition database, in accordance with the recognition accuracy parameter, a signal processing unit that extracts frequency components of an input speech signal by computing a Fourier transform of the speech signal and generates a feature pattern indicating distribution of the frequency components of the speech signal, and a match detecting unit that detects a match between the feature pattern generated from at least a part of the speech signal and the standard pattern if the feature pattern falls within the range of spread of the standard pattern, and outputs a speech recognition result that specifies a word or sentence with respect to which a match is detected out of the words or sentences constituting the conversion candidates.

Moreover, a speech recognition device according to the fourth aspect of the invention includes the semiconductor integrated circuit device according to the fourth aspect of the invention and a control unit that sends the text data indicating the words or sentences constituting the conversion candidates and the recognition accuracy parameter to the semiconductor integrated circuit device together with the command.

Furthermore, a method for speech recognition according to the fourth aspect of the invention includes (a) receiving text data indicating words or sentences constituting conversion candidates and a recognition accuracy parameter indicating the degree of exactness with respect to recognition accuracy that is applied when the words or sentences constituting the conversion candidates are recognized together with a command, and setting the text data in a conversion list in accordance with the command, (b) extracting, from a speech recognition database containing standard patterns indicating distribution of frequency components of a plurality of phonemes that are used in a predetermined language, a standard pattern corresponding to at least a part of the words or sentences indicated by the text data that is set in the conversion list, (c) adjusting a range of spread of the standard pattern extracted from the speech recognition database, in accordance with the recognition accuracy parameter, (d) extracting frequency components of an input speech signal by computing a Fourier transform of the speech signal and generating a feature pattern indicating distribution of the frequency components of the speech signal, and (e) detecting a match between the feature pattern generated from at least a part of the speech signal and the standard pattern if the feature pattern falls within the range of spread of the standard pattern, and outputs a speech recognition result that specifies a word or sentence with respect to which a match is detected out of the words or sentences constituting the conversion candidates.

According to the fourth aspect of the invention, in the case where speech recognition is performed in accordance with a deep hierarchical menu, the recognition rate of speech recognition can be improved by appropriately restricting the number of options as well as setting a recognition accuracy parameter suitable for a combination of the options and adjusting the range of spread of the standard pattern in accordance with the recognition accuracy parameter.

A semiconductor integrated circuit device according to a fifth aspect of the invention further includes a speech signal synthesizing unit that receives response data indicating a response content with respect to the speech recognition result and synthesizes an output speech signal on the basis of the response data. Thus, it is possible to create a situation in which a user's reply to the question or message that is emitted on the basis of the response data is expected to be one of a number of words or sentences.

A speech recognition device according to the fifth aspect of the invention includes the semiconductor integrated circuit device according to the fifth aspect of the invention and a control unit that selects the response content out of a plurality of response contents in accordance with the speech recognition result output from the semiconductor integrated circuit device and sends the response data indicating the selected response content, the text data indicating the words or sentences constituting the conversion candidates for a reply to the response content, and the recognition accuracy parameter that is selected according to the words or sentences constituting the conversion candidates to the semiconductor integrated circuit device together with the command. Thus, it is possible to set the text data indicating the plurality of words or sentences corresponding to the question or message that is emitted on the basis of the response data in the conversion list and set the recognition accuracy parameter that is selected according to those words or sentences in the recognition accuracy adjustment unit.

In a semiconductor integrated circuit device according to a sixth aspect of the invention, when a level of the speech signal exceeds a predetermined value, the signal processing unit activates a speech detection signal. Thus, it is possible to judge whether or not there is a request or reply from the user.

A speech recognition device according to the sixth aspect of the invention includes the semiconductor integrated circuit device according to the sixth aspect of the invention and a control unit that, if the speech recognition result indicating a match between the feature pattern and the standard pattern is not obtained within a predetermined period of time after activation of the speech detection signal, sends a new recognition accuracy parameter to the semiconductor integrated circuit device together with a new command and controls the semiconductor integrated circuit device so that match detection is performed. Thus, if the speech recognition result indicating a match between the feature pattern and the standard pattern is not obtained within the predetermined period of time, it is possible to perform match detection again after changing the recognition accuracy parameter.

BRIEF DESCRIPTION OF THE DRAWINGS

The invention will be described with reference to the accompanying drawings, wherein like numbers reference like elements.

FIG. 5 is a diagram illustrating a conversion list A containing a plurality of food names displayed on a food menu.

FIG. 6 is a diagram illustrating a conversion list B containing a plurality of replies to a question.

DESCRIPTION OF EXEMPLARY EMBODIMENTS

The following describes embodiments of the invention in detail with reference to the drawings.

Figure 1:
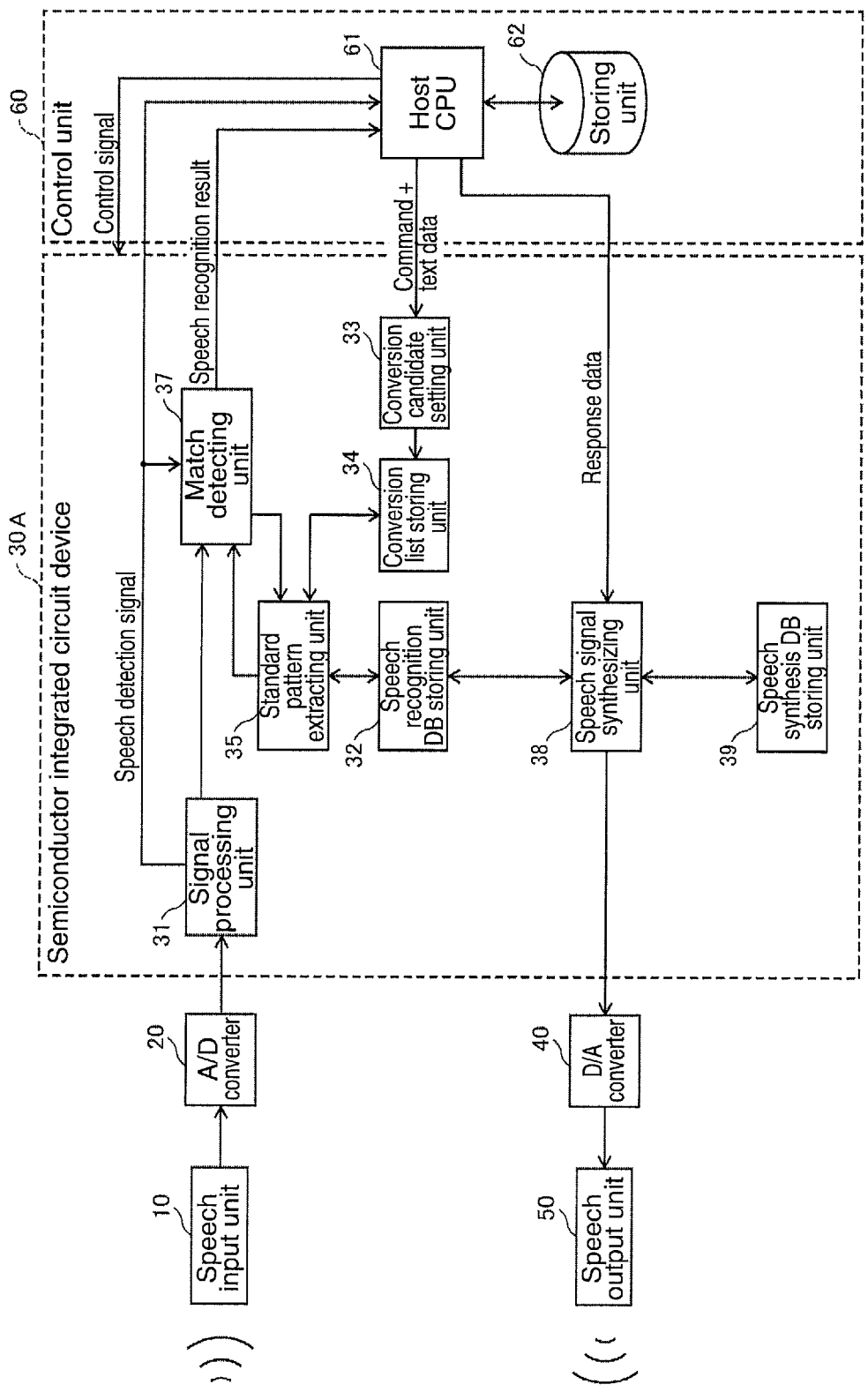
FIG. 1 is a diagram illustrating an example of the configuration of a speech recognition device according to an embodiment of the invention.

FIG. 1 is a diagram illustrating an example of the configuration of a speech recognition device according to an embodiment of the invention. This speech recognition device may be installed in, for example, a vending machine, a home electrical appliance, a household fixture, an in-vehicle device (a navigation device or the like), or a mobile terminal, and recognizes user's speech and provides a response or performs processing in accordance with the recognition result.

As illustrated in FIG. 1, the speech recognition device includes a speech input unit 10, an A/D converter 20, a semiconductor integrated circuit device 30A for speech recognition, a D/A converter 40, a speech output unit 50, and a control unit 60. Note that at least some of the speech input unit 10, the A/D converter 20, the D/A converter 40, and the speech output unit 50 may be embedded in the semiconductor integrated circuit device 30A.

The control unit 60 includes a host CPU (central processing unit) 61 and a storing unit 62. The host CPU 61 operates on the basis of software (speech recognition control program) that is recorded in a recording medium of the storing unit 62. A hard disk, a flexible disk, an MO, an MT, a CD-ROM, a DVD-ROM, or the like may be used as the recording medium. The host CPU 61 controls the speech recognition operations of the semiconductor integrated circuit device 30A by supplying a control signal to the semiconductor integrated circuit device 30A.

The speech input unit 10 includes a microphone that converts speech into an electric signal (speech signal), an amplifier that amplifies the speech signal output from the microphone, and a low-pass filter that restricts the band of the amplified speech signal. The A/D converter 20 samples the analog speech signal output from the speech input unit 10 and thereby converts the signal into a digital speech signal (speech data). For example, the speech frequency band of the speech data is 12 kHz, and the bit number thereof is 16 bits.

The semiconductor integrated circuit device 30A includes a signal processing unit 31, a speech recognition DB (database) storing unit 32, a conversion candidate setting unit 33, a conversion list storing unit 34, a standard pattern extracting unit 35, and a match detecting unit 37. Furthermore, the semiconductor integrated circuit device 30A may also include a speech signal synthesizing unit 37 and/or a speech synthesis DB (database) storing unit 39.

The signal processing unit 31 computes the Fourier transform of an input speech signal, thereby extracting a plurality of frequency components of the speech signal, and generates a feature pattern indicating the distribution of the frequency components of that speech signal. The generated feature pattern is output to the match detecting unit 37. Also, when the level of the input speech signal exceeds a predetermined value, the signal processing unit 31 activates and outputs a speech detection signal to the match detecting unit 37 and the host CPU 61. Thus, it is possible to judge whether or not there is a request or reply from the user.

Now, an example of the method for obtaining a feature pattern from a speech signal will be described. The signal processing unit 31 applies filtering to an input speech signal to emphasize high-frequency components. Next, the signal processing unit 31 multiplies a speech waveform indicated by the speech signal by a Hamming window, thereby segmenting the time-series speech signal into parts of a predetermined time period and creating a plurality of frames. Furthermore, the signal processing unit 31 computes the Fourier transform of the speech signal for each frame, thereby extracting a plurality of frequency components. Since each frequency component is a complex number, the signal processing unit 31 obtains an absolute value of each frequency component.

The signal processing unit 31 multiplies those frequency components by windows of frequency regions that are determined on the basis of the mel scale and computes integrals, thereby obtaining the same number of numerical values as the number of windows. Furthermore, the signal processing unit 31 computes logarithms of those numerical values and computes the discrete cosine transform of each logarithmic value. Thus, if the number of windows of frequency regions is 20, 20 numerical values are obtained.

Lower-order values (e.g., 12 values) of the thus obtained numerical values are referred to as MFCCs (mel frequency cepstral coefficients). The signal processing unit 31 computes MFCCs for each frame, concatenates the MFCCs in accordance with a HMM (hidden Markov model), and obtains a feature pattern as the MFCCs that correspond to respective phonemes contained in the chronologically input speech signal.

Here, a "phoneme" means sound elements that are considered identical in a language. Hereinafter, cases where the Japanese language is used will be described. The Japanese phonemes correspond to the vowels /a/, /i/, /u/, /e/, and /o/, the consonants such as /k/, /s/, /t/, and /n/, the semivowels /j/ and /w/, and the special morae /N/, /Q/, and /H/.

The speech recognition database storing unit 32 stores a speech recognition database that contains standard patterns indicating the distribution of frequency components with respect to various phonemes that are used in a predetermined language. In the speech recognition database, text data indicating the various phonemes is associated with the standard patterns serving as option information.

The standard patterns are created beforehand using speech spoken by a large number (e.g., about 200) of speakers. To create the standard patterns, MFCCs are obtained from speech signals indicating respective phonemes. However, with regard to the MFCCs that are created using speech spoken by a large number of speakers, there are variations in the numerical values.

Accordingly, the standard pattern with respect to each phoneme has a spread, including variations, in a multidimensional space (e.g., twelve-dimensional space). If a feature pattern generated from a speech signal input to the signal processing unit 31 falls within the range of the spread of a standard pattern, it is judged that the two patterns indicate the same phoneme.

It is also possible to use a plurality of speech recognition databases rather than a single speech recognition database. For example, the speech recognition database storing unit 32 may store a plurality of speech recognition databases that are generated on the basis of speech signals obtained by recording speech spoken by speakers belonging to a plurality of groups classified by age and gender. In that case, the match detecting unit 37 can selectively use a speech recognition database that enables favorable match detection with respect to phonemes out of the plurality of speech recognition databases.

Alternatively, in the case where the age and gender of the user of the speech recognition device can be specified, the speech recognition database storing unit 32 may store the plurality of speech recognition databases, which are generated on the basis of speech data obtained by recording speech spoken by speakers belonging to a plurality of groups classified by age and gender, in association with information that specifies the age and gender. In that case, the match detecting unit 37 can selectively use one speech recognition database out of the plurality of speech recognition databases, which are stored in the speech recognition database storing unit 32, in accordance with the information that specifies the age and gender of the user of the speech recognition device.

When the conversion candidate setting unit 33 receives text data indicating a plurality of words or sentences constituting conversion candidates from the host CPU 61 together with a command, the conversion candidate setting unit 33 sets the text data in a conversion list in accordance with the received command. The conversion list storing unit 34 stores that conversion list.

With regard to the command, for example, a set command for newly setting all the text data in the conversion list, an add command for adding a part of text data to the conversion list, and a delete command for deleting a part of text data from the conversion list may be used. Accordingly, it is also possible to change a part of the conversion list as desired without replacing the entire conversion list. Note that predetermined text data may be set in the conversion list beforehand.

If new text data is set in the conversion list in the conversion list storing unit 34, the standard pattern extracting unit 35 extracts a standard pattern corresponding to at least a part of the words or sentences indicated by the text data that is set in the conversion list from the speech recognition database.

The match detecting unit 37 operates when the speech detection signal is activated, and compares a feature pattern that is generated from at least a part of an input speech signal with the standard pattern that is extracted from the speech recognition database, thereby detecting a match between these patterns.

For example, the match detecting unit 37 compares a feature pattern generated from the first syllable of an input speech signal with a standard pattern corresponding to the first syllable of each of the words or sentences indicated by the text data that is set in the conversion list. Note that if the conversion list contains only one conversion candidate having a syllable with respect to which a match is detected as its first syllable, it may be judged that the conversion candidate is the word or sentence after conversion. If the conversion list contains a plurality of conversion candidates having a syllable with respect to which a match is detected as their first syllables, the match detecting unit 37 expands the range of syllables with respect to which match detection is to be performed, until the conversion candidates are narrowed down to one.

Here, a "syllable" means a unit of sound that is made up of one vowel forming the main sound, with or without one or a plurality of consonants around that vowel. Moreover, a semivowel or a special mora also may constitute a syllable. That is to say, one syllable is composed of one or a plurality of phonemes. The Japanese syllables correspond to "a", "i", "u", "e", "o", "ka", "ki", "ku", "ke", "ko", and so on.

For example, a standard pattern corresponding to the syllable "a" refers to a standard pattern with respect to the phoneme /a/ constituting the syllable "a". Moreover, standard patterns corresponding to the syllable "ka" refer to a standard pattern with respect to the first phoneme /k/ constituting the syllable "ka" and a standard pattern with respect to the second phoneme /a/ constituting the syllable "ka".

In the case where one syllable of an input speech signal consists of a single phoneme, if a match is detected with respect to that phoneme, then this means that a match is detected with respect to that syllable. On the other hand, in the case where one syllable of an input speech signal consists of a plurality of phonemes, if a match is detected with respect to those phonemes, then this means that a match is detected with respect to that syllable.

When a match between a feature pattern and a standard pattern is detected, the match detecting unit 37 outputs information that specifies a word or sentence having the syllable with respect to which the match is detected, for example, text data indicating that word or sentence as a speech recognition result. Thus, the host CPU 61 can recognize the word or sentence corresponding to at least a part of the speech signal that is input to the semiconductor integrated circuit device 30A.

The host CPU 61 selects one response content out of a plurality of response contents (questions or messages) in accordance with the speech recognition result output from the semiconductor integrated circuit device 30A, and sends response data indicating the selected response content to the semiconductor integrated circuit device 30A.

The speech signal synthesizing unit 38 of the semiconductor integrated circuit device 30A receives the response data indicating the response content suitable for the speech recognition result from the host CPU 61, and synthesizes a speech signal indicating speech to be output on the basis of the received response data. To synthesize a speech signal, a speech synthesis database stored in the speech synthesis database storing unit 39 may be used, but it is also possible to synthesize a speech signal using the speech recognition database stored in the speech recognition database storing unit 32.

In that case, for example, the speech signal synthesizing unit 38 obtains, with respect to each phoneme contained in the response content, a frequency spectrum from the standard pattern contained in the speech recognition database. Furthermore, the speech signal synthesizing unit 38 obtains a speech waveform by computing the inverse Fourier transform of the frequency spectrum and joins a plurality of speech waveforms with respect to a plurality of phonemes contained in the response content together, thereby synthesizing a digital speech signal corresponding to the response content.

The D/A converter 40 converts the digital speech signal output from the speech signal synthesizing unit 38 into an analog speech signal. The speech output unit 50 includes a power amplifier that amplifies the power of the analog speech signal output from the D/A converter 40 and a speaker that emits speech in accordance with the power-amplified speech signal. The speaker outputs the response content indicated by the response data supplied from the host CPU 61 as speech. Thus, a situation can be created in which a user's reply to the question or message that is emitted on the basis of the response data is expected to be one of a number of words or sentences.

Moreover, the host CPU 61 sends text data indicating a plurality of words or sentences constituting conversion candidates for the reply to the selected question or message to the semiconductor integrated circuit device 30A together with a set command. When the conversion candidate setting unit 33 of the semiconductor integrated circuit device 30A receives the set command and the text data from the host CPU 61, the conversion candidate setting unit 33 sets the text data in the conversion list in accordance with the set command. Thus, the text data indicating the plurality of words or sentences constituting the conversion candidates for the reply to the question or message that is emitted on the basis of the response data can be set in the conversion list.

Figure 2:
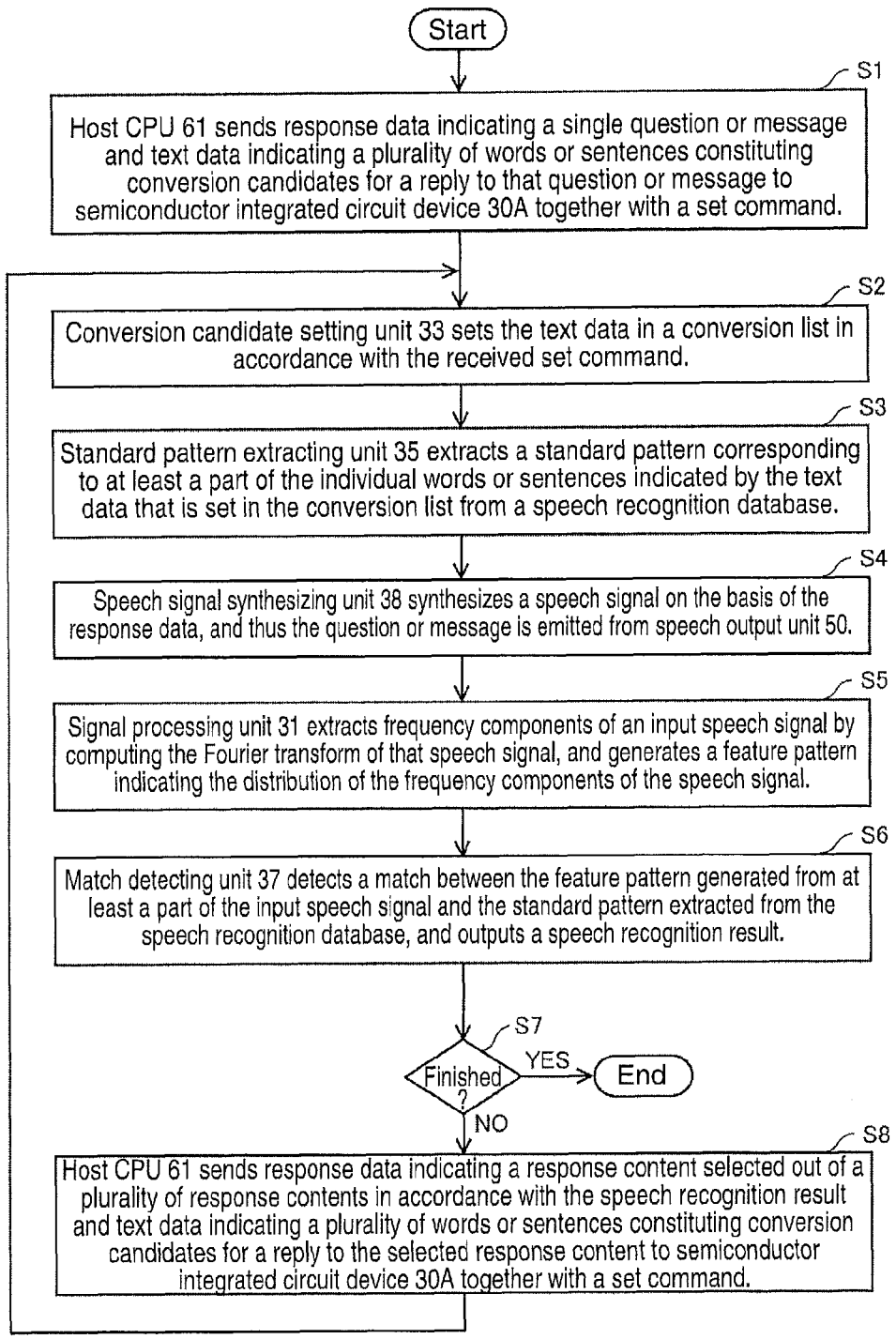
FIG. 2 is a flowchart illustrating a speech recognition method that is carried out by the speech recognition device illustrated in FIG. 1.

Next, a speech recognition method according to the embodiment of the invention will be described with reference to FIGS. 1 and 2. FIG. 2 is a flowchart illustrating a speech recognition method that is carried out by the speech recognition device illustrated in FIG. 1.

In step S1 of FIG. 2, when the power to the semiconductor integrated circuit device 30A is turned on or after the semiconductor integrated circuit device 30A is reset, the host CPU 61 sends response data indicating a single question or message and text data indicating a plurality of words or sentences constituting conversion candidates for a reply to that question or message to the semiconductor integrated circuit device 30A together with a set command.

In step S2, the conversion candidate setting unit 33 of the semiconductor integrated circuit device 30A receives the set command and the text data from the host CPU 61 and sets the text data in the conversion list in accordance with the received set command.

When the new text data is set in the conversion list, in step S3, the standard pattern extracting unit 35 extracts a standard pattern corresponding to at least a part of the individual words or sentences indicated by the text data that is set in the conversion list, from the speech recognition database containing standard patterns indicating the distribution of frequency components of a plurality of phonemes that are used in a predetermined language.

In step S4, the speech signal synthesizing unit 38 synthesizes a speech signal on the basis of the received response data, and thus the question or message is emitted from the speech output unit 50. When the user says words as a reply to this, in step S5, the signal processing unit 31 extracts frequency components of an input speech signal by computing the Fourier transform of that speech signal, and generates a feature pattern indicating the distribution of the frequency components of the speech signal. Also, the signal processing unit 31 activates a speech detection signal.

If the speech detection signal is activated, in step S6, the match detecting unit 37 detects a match between the feature pattern generated from at least a part of the input speech signal and the standard pattern extracted from the speech recognition database, and outputs a speech recognition result that specifies a word or sentence with respect to which a match is detected out of the plurality of words or sentences constituting the conversion candidates.

If a speech recognition result indicating a match between the feature pattern and the standard pattern is not obtained within a predetermined period of time after the activation of the speech detection signal, the host CPU 61 may send text data to be added to the conversion list to the semiconductor integrated circuit device 30A together with an add command and control the semiconductor integrated circuit device 30A so that match detection is performed again. Thus, if a speech recognition result indicating a match between the feature pattern and the standard pattern is not obtained within the predetermined period of time, it is possible to perform match detection again after adding an option.

Alternatively, the host CPU 61 may send response data indicating a message such as "Could you please say that again?" to the semiconductor integrated circuit device 30A, or may send response data indicating a question that has been restated to achieve greater clarity to the semiconductor integrated circuit device 30A. The speech signal synthesizing unit 38 synthesizes a speech signal on the basis of the response data supplied from the host CPU 61, and the new message or question is emitted from the speech output unit 50.

If a speech recognition result indicating a match between the feature pattern and the standard pattern is obtained within the predetermined period of time after the activation of the speech detection signal, in step S7, the host CPU 61 judges whether or not a series of speech recognition operations have been finished. If the series of speech recognition operations have been finished, the processing is ended. On the other hand, if the series of speech recognition operations have not been finished, the processing proceeds to step S8.

In step S8, the host CPU 61 selects one response content out of a plurality of response contents in accordance with the speech recognition result output from the semiconductor integrated circuit device 30A, and sends response data indicating the selected response content and text data indicating a plurality of words or sentences constituting conversion candidates for a reply to the selected response content to the semiconductor integrated circuit device 30A together with a set command. Thus, the processing after step S2 is repeated.

According to the above-described embodiment of the invention, the use of a conversion list conforming to a speech recognition scenario makes it possible to narrow standard patterns to be compared with a feature pattern of an input speech signal down to a standard pattern corresponding to at least a part of individual words or sentences indicated by text data that is set in the conversion list.

At this time, the contents of the conversion list can be freely set in conformity with the speech recognition scenario by sending a set command and text data from the host CPU 61 to the semiconductor integrated circuit device 30A. On the other hand, it is possible to delete a conversion candidate that is no longer required from the conversion list and reduce the load of the speech recognition processing by sending a delete command and text data from the host CPU 61 to the conversion candidate setting unit 33.

Moreover, the extraction of a standard pattern corresponding to at least a part of the individual words or sentences indicated by the text data that is set in the conversion list from the speech recognition database facilitates updating of the option information in speech recognition. Consequently, it is possible to improve the recognition rate by appropriately restricting the range of the option information or to enable a deep speech recognition hierarchical menu to be handled.

Next, a specific example of the speech recognition operations of a speech recognition device according to the embodiment of the invention will be described. Here, a case where the speech recognition device illustrated in FIG. 1 is applied to a food ticket vending machine in a cafeteria will be described.

A food menu containing a plurality of food names is displayed on the vending machine. It is assumed that characters such as "soba", "udon", "kareh" (curry), and "katsudon" (pork cutlet rice bowl) are displayed on the food menu. In that case, the user's first word is expected to be any of "soba", "udon", "kareh", "katsudon", and the like that are displayed on the food menu.

Thus, when the power to the vending machine is turned on or after the vending machine is reset, the host CPU 61 sends text data indicating the plurality of food names displayed on the food menu to the semiconductor integrated circuit device 30A together with a set command. The conversion candidate setting unit 33 of the semiconductor integrated circuit device 30A sets the received text data in the conversion list in accordance with the received set command.

Moreover, if an item is added to the food menu during the speech recognition operations, the host CPU 61 sends text data indicating the food name of the added item to the semiconductor integrated circuit device 30A together with an add command. The conversion candidate setting unit 33 of the semiconductor integrated circuit device 30A adds the received text data to the conversion list in accordance with the received add command.

On the other hand, if any of the items on the menu sells out during the speech recognition operations, the host CPU 61 sends text data indicating the food name of the item that has sold out to the semiconductor integrated circuit device 30A together with a delete command. The conversion candidate setting unit 33 of the semiconductor integrated circuit device 30A deletes the received text data from the conversion list in accordance with the received delete command.

In this manner, a conversion list A shown in FIG. 5 is created. FIG. 5 shows numbers corresponding to the respective food names, the food names given in Japanese, and the phonemes contained in the food names given in Roman characters, but the conversion list is only required to contain at least Roman characters or kana characters that can specify the phonemes contained in the food names.

When the conversion list A is created, the standard pattern extracting unit 35 extracts standard patterns corresponding to the respective phonemes /s•o/, /u/, /k•a/, /k•a/, and the like contained in the first syllables "so", "u", "ka", "ka", and the like of the food names "soba", "udon", "kareh", "katsudon", and the like contained in the conversion list A, from the speech recognition database.

Moreover, the host CPU 61 sends communication data indicating a question or message "Which item would you like? Please say the food name" to the semiconductor integrated circuit device 30A. The speech signal synthesizing unit 38 of the semiconductor integrated circuit device 30A synthesizes a speech signal on the basis of this communication data and outputs the speech signal to the D/A converter 40. The D/A converter 40 converts the digital speech signal into an analog speech signal and outputs the analog speech signal to the speech output unit 50. Thus, the question or message "Which item would you like? Please say the food name" is emitted from the speech output unit 50.

If the user says "Katsudon wo kudasai" (Katsudon, please), looking at the displayed food menu, in response to the question or message emitted from the speech output unit 50, the signal processing unit 31 generates a feature pattern indicating the distribution of frequency components with respect to each of the phonemes /k•a•t•u•d•o•N . . . /.

The match detecting unit 37 compares the feature pattern of the first phoneme /k/ of the first syllable that is generated by the signal processing unit 31 with the standard patterns of the first phonemes /s/, /u/, /k/, /k/, and the like of the first syllables that are extracted from the speech recognition database, and thereby detects a match with respect to the phoneme /k/.

If the phoneme with respect to which a match is detected represents a consonant, the match detecting unit 37 further makes a comparison with respect to the second phoneme of the first syllable. The match detecting unit 37 compares the feature pattern of the second phoneme /a/ of the first syllable that is generated by the signal processing unit 31 with the standard patterns of the second phonemes /o/, /a/, /a/, and the like of the first syllable that are extracted from the speech recognition database, and thereby detects a match with respect to the phoneme /a/.

Thus, a match is detected with respect to the syllable "ka". If the match is detected with respect to only one food name, a speech recognition result is obtained here. However, since the conversion list contains the food name "kareh" and the food name "katsudon", it is not possible to recognize which applies. In such a case, the match detecting unit 37 expands the range of syllables with respect to which match detection is to be performed.

That is to say, the match detecting unit 37 outputs a signal for requesting extraction of standard patterns corresponding to the second syllables of the above-described food names contained in the conversion list to the standard pattern extracting unit 35. Thus, the standard pattern extracting unit 35 extracts, from the speech recognition database, standard patterns indicating the distribution of frequency components with respect to the phonemes /r•e/ and /t•u/ contained in the second syllables "re" and "tsu" of the food names "kareh" and "katsudon" contained in the conversion list.

The match detecting unit 37 compares the feature pattern of the first phoneme /t/ of the second syllable that is generated by the signal processing unit 31 with the standard patterns of the first phonemes /r/ and /t/ of the second syllables that are extracted from the speech recognition database, thereby detecting a match with respect to the phoneme /t/.

Furthermore, the match detecting unit 37 compares the feature pattern of the second phoneme /u/ of the second syllable that is generated by the signal processing unit 31 with the standard patterns of the second phonemes /e/ and /u/ of the second syllables that are extracted from the speech recognition database, thereby detecting a match with respect to the phoneme /u/.

Thus, a match is detected with respect to the syllable "tsu". If another food name having the first syllable "ka" and the second syllable "tsu" is present, the match detecting unit 37 can further expand the range of syllables with respect to which match detection is to be performed. The match detecting unit 37 outputs a speech recognition result that specifies the food name "katsudon" having the first syllable "ka" and the second syllable "tsu", with respect to which the match is detected, to the host CPU 61.

The information that specifies the food name "katsudon" corresponds to the number shown in FIG. 5, the food name "katsudon" or a part thereof "katsu" given in Japanese, the phonemes /katudoN/ contained in the food name or a part thereof /katu/ given in Roman characters, or the like. Thus, the host CPU 61 can recognize the food name "katsudon" corresponding to at least a part of the input speech signal.

When the first cycle of the speech recognition operations is finished in this manner, the host CPU 61 starts a second cycle of the speech recognition operations. The host CPU 61 selects one suitable response content out of the plurality of response contents indicated by the response data stored in the storing unit 62, in accordance with the received speech recognition result, and sends response data indicating the selected response content and text data indicating a plurality of conversion candidates for a reply to the selected response content to the semiconductor integrated circuit device 30A together with a set command.

The conversion candidate setting unit 33 of the semiconductor integrated circuit device 30A deletes all the current text data from the conversion list in accordance with the received set command, and then sets the received text data in the conversion list.

For example, the host CPU 61 supplies response data indicating a question "How many?" to the speech signal synthesizing unit 38. In that case, the user's first word to this question is expected to be any of a plurality of replies such as "hitotsu" (one), "hutatsu" (two), and "mittsu" (three). Thus, the host CPU 61 sends text data indicating the plurality of replies such as "hitotsu", "hutatsu", and "mittsu" to the semiconductor integrated circuit device 30A together with a set command.

In this manner, a conversion list B shown in FIG. 6 is created. When the conversion list B is created, the standard pattern extracting unit 35 extracts, from the speech recognition database, standard patterns indicating the distribution of frequency components with respect to each of the phonemes /h•i/, /h•u/, /m•i/, and the like contained in the first syllables "hi", "hu", "mi", and the like of the words "hitotsu", "hutatsu", "mittsu", and the like that are indicated by the text data contained in the conversion list B.

The speech signal synthesizing unit 38 synthesizes a speech signal on the basis of the response data supplied from the host CPU 61 and outputs the speech signal to the D/A converter 40. The D/A converter 40 converts the digital speech signal into an analog speech signal and outputs the analog speech signal to the speech output unit 50. Thus, the question "How many?" is emitted from the speech output unit 50 to the user.

If the user says "Hitotsu desu" (One, please) in response to the question emitted from the speech output unit 50, the signal processing unit 31 generates a feature pattern indicating the distribution of frequency components with respect to each of the phonemes /h•i•t•o•t•u . . . /.

The match detecting unit 37 compares the feature pattern of the first phoneme /h/ of the first syllable that is generated by the signal processing unit 31 with the standard patterns of the first phonemes /h/, /h/, /m/, and the like of the first syllables that are extracted from the speech recognition database, thereby detecting a match with respect to the phoneme /h/.

If the phoneme with respect to which a match is detected represents a consonant, the match detecting unit 37 further compares the feature pattern of the second phoneme /i/ of the first syllable that is generated by the signal processing unit 31 with the standard patterns of the second phonemes /i/, /u/, /i/, and the like of the first syllables that are extracted from the speech recognition database, thereby detecting a match with respect to the phoneme /i/.

Thus, a match is detected with respect to the syllable "hi". The match detecting unit 37 outputs a speech recognition result that specifies the word "hitotsu" having the syllable "hi", with respect to which the match is detected, as the first syllable of that word to the host CPU 61. Thus, the host CPU 61 can recognize the word "hitotsu" that corresponds to at least a part of the input speech signal.

Then, the host CPU 61 supplies response data indicating a message "Please insert XXX yen" to the speech signal synthesizing unit 38. The speech signal synthesizing unit 38 synthesizes a speech signal on the basis of the response data supplied from the host CPU 61 and outputs the speech signal to the D/A converter 40. The D/A converter 40 converts the digital speech signal into an analog speech signal and outputs the analog speech signal to the speech output unit 50. Thus, the message "Please insert XXX yen" is emitted from the speech output unit 50 to the user.

Next, another embodiment of the invention will be described in detail with reference to the drawings.

Figure 3:
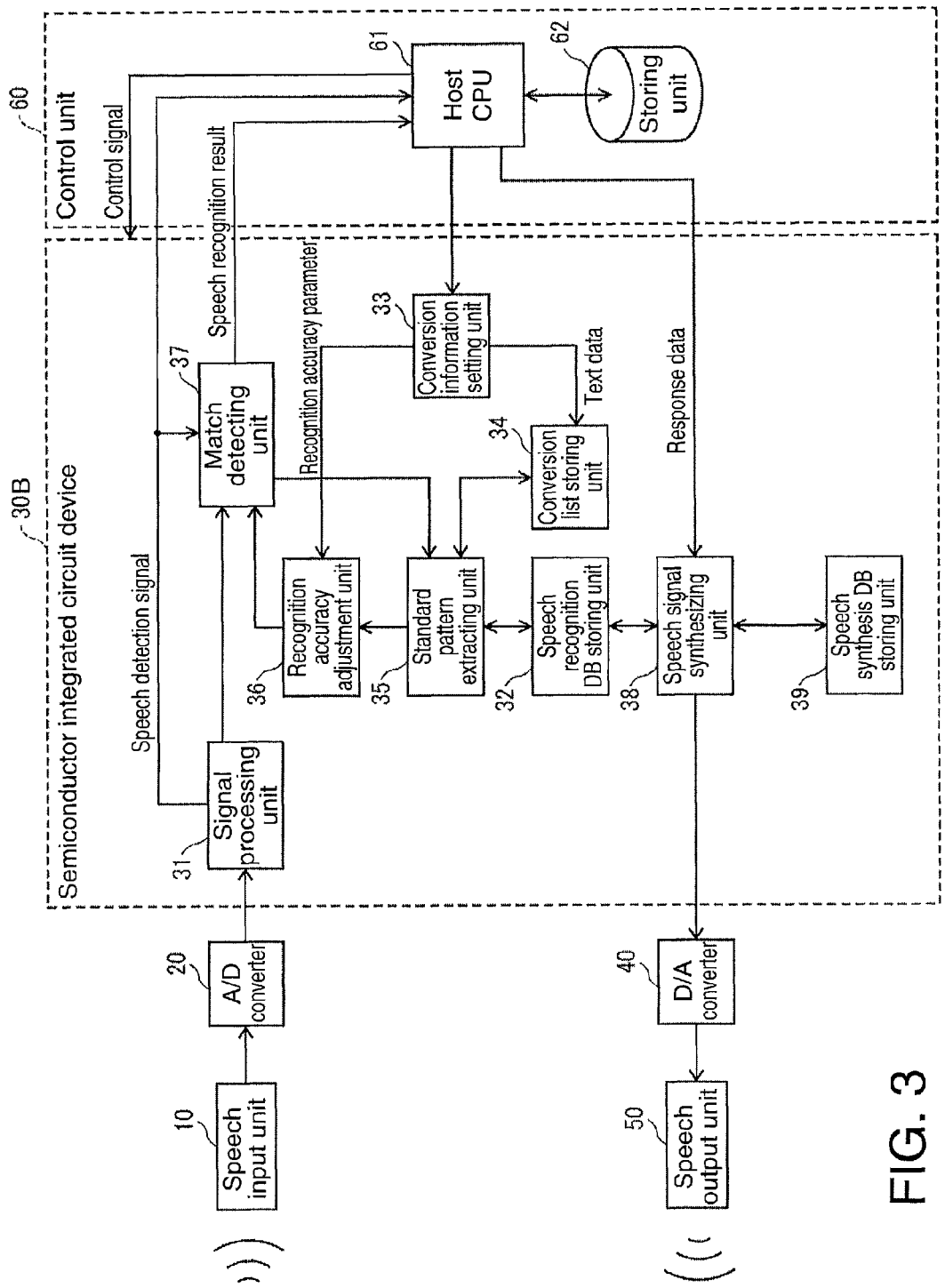
FIG. 3 is a diagram illustrating an example of the configuration of a speech recognition device according to another embodiment of the invention.

FIG. 3 is a diagram illustrating an example of the configuration of a speech recognition device according to another embodiment of the invention. This speech recognition device may be installed in, for example, a vending machine, a home electrical appliance, a household fixture, an in-vehicle device (navigation device or the like), or a mobile terminal, and recognizes user's speech and provides a response or performs processing in accordance with the recognition result.

Note that with regard to constitutional elements illustrated in FIG. 3, the same descriptions that have been given in relation to FIG. 1 apply to those constitutional elements that are denoted by the same reference numerals as those in FIG. 1, and therefore the descriptions thereof will be omitted below.

A semiconductor integrated circuit device 30B includes the signal processing unit 31, the speech recognition DB (database) storing unit 32, a conversion information setting unit 33, the conversion list storing unit 34, the standard pattern extracting unit 35, a recognition accuracy adjustment unit 36, and the match detecting unit 37. Furthermore, the semiconductor integrated circuit device 30B may also include the speech signal synthesizing unit 38 and/or the speech synthesis DB (database) storing unit 39.

The conversion information setting unit 33 receives text data indicating a plurality of words or sentences constituting conversion candidates and a recognition accuracy parameter indicating the degree of exactness with respect to the recognition accuracy that is applied when a word or sentence is recognized on the basis of a speech signal from the host CPU 61 together with a command. Moreover, the conversion information setting unit 33 sets the text data in a conversion list in accordance with the received command, and sets the recognition accuracy parameter in the recognition accuracy adjustment unit 36. The conversion list storing unit 34 stores the conversion list.

With regard to the command, for example, a set command for newly setting all the text data in the conversion list and the recognition accuracy parameter, an add command for adding a part of text data to the conversion list, and a delete command for deleting a part of text data from the conversion list may be used. Accordingly, it is also possible to change a part of the conversion list as desired without replacing the entire conversion list. Moreover, a change command for changing only the recognition accuracy parameter may also be used. Note that predetermined text data may be set in the conversion list beforehand.

The recognition accuracy adjustment unit 36 changes the range of spread of a standard pattern extracted from the speech recognition database 32, in accordance with the recognition accuracy parameter set by the conversion information setting unit 33. The standard pattern extracted from the speech recognition database 32 by the standard pattern extracting unit 35 has a spread, including variations, in a multidimensional space, and the recognition accuracy adjustment unit 36 adjusts the range of the spread of the standard pattern.

In an example below, the degrees of exactness or fuzziness with respect to the recognition accuracy, which are indicated by recognition accuracy parameters, are classified into M ranks (M is a natural number greater than or equal to 2) from the fuzziest rank 1 to the most exact rank M. When the spread of a certain standard pattern A in an N-dimensional space (N is a natural number) is represented by $A1(i)$ to $A2(i)$ ($i=1, 2, \ldots, N$), the range of spread $A1a(i)$ to $A2a(i)$ of the standard pattern A that is adjusted by the recognition accuracy adjustment unit 36 is expressed as, for example, the following equations using a rank R ($1 \leq R \leq M$):

$$A1a(i) = A1(i) - k \cdot (M-R) \cdot (A2(i) - A1(i))$$

$$A2a(i) = A2(i) + k \cdot (M-R) \cdot (A2(i) - A1(i))$$

where k is a constant.

For example, in the case where speech recognition is applied to control of automobiles, in order to prevent erroneous control, the recognition accuracy parameter "M", which indicates the most exact rank M, is set. On the other hand, in the case where one of two words contained in the conversion list is to be selected, the probability that an error occurs in speech recognition is low, and therefore the recognition accuracy parameter "1", which indicates the fuzziest rank 1, is set.

Alternatively, different recognition accuracy parameters may be set depending on whether the number of options in the conversion list is larger or smaller than a predetermined number. Moreover, different recognition accuracy parameters may be set depending on whether the number of similar words contained in the options in the conversion list is larger or smaller than a predetermined number.

The match detecting unit 37 operates when the speech detection signal is activated, and compares a feature pattern that is generated by the signal processing unit 31 with a standard pattern with respect to which the range of spread is adjusted by the recognition accuracy adjustment unit 36. Then, the match detecting unit 37 judges whether or not the feature pattern that is generated from at least a part of the input speech signal falls within the range of spread of the standard pattern that is adjusted by the recognition accuracy adjustment unit 36.

The comparison is performed with respect to each component in the N-dimensional space, and if the following formula is satisfied with respect to $i=1, 2, \ldots, N$, it is judged that a feature pattern B falls within the range of spread of the standard pattern A:

$$A1a(i) \leq B(i) \leq A2a(i)$$

If a feature pattern that is generated from at least a part of an input speech signal falls within the range of spread of a standard pattern, the match detecting unit 37 detects a match between these patterns.

For example, the match detecting unit 37 compares a feature pattern that is generated from the first syllable of the input speech signal with a standard pattern corresponding to the first syllable of each of the words or sentences indicated by the text data that is set in the conversion list. In the case where the conversion list contains only one conversion candidate having as its first syllable the syllable with respect to which a match is detected, that conversion candidate is taken as the word or sentence after conversion. On the other hand, in the case where the conversion list contains a plurality of conversion candidates having as their first syllables the syllable with respect to which a match is detected, the match detecting unit 37 expands the range of syllables with respect to which match detection is to be performed until the conversion candidates are narrowed down to a single candidate.

Moreover, the host CPU 61 sends text data indicating a plurality of words or sentences constituting conversion candidates for a reply to a selected question or message and a recognition accuracy parameter that is selected according to those words or sentences to the semiconductor integrated circuit device 30B together with a set command.

When the conversion information setting unit 33 of the semiconductor integrated circuit device 30B receives the text data and the recognition accuracy parameter from the host CPU 61 together with the set command, the conversion information setting unit 33 sets the text data in the conversion list in accordance with the received set command and sets the recognition accuracy parameter in the recognition accuracy adjustment unit 36. Thus, the text data indicating the plurality of words or sentences corresponding to the question or message to be emitted on the basis of the response data can be set in the conversion list, and the recognition accuracy parameter that is selected according to those words or sentences can be set in the recognition accuracy adjustment unit 36.

Figure 4:
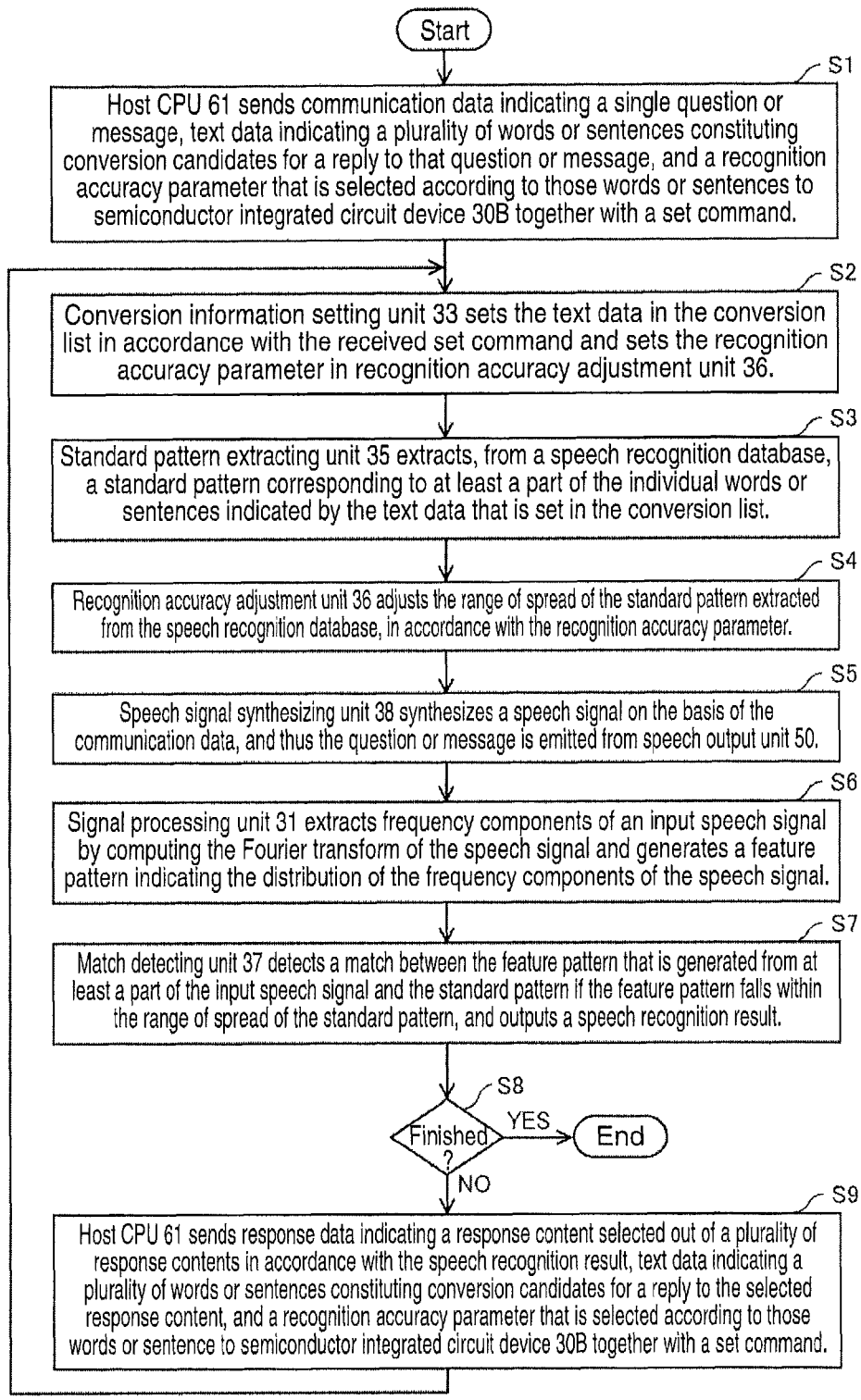
FIG. 4 is a flowchart illustrating a speech recognition method that is carried out by the speech recognition device illustrated in FIG. 3.

Next, a speech recognition method according to the embodiment of the invention will be described with reference to FIGS. 3 and 4. FIG. 4 is a flowchart illustrating a speech recognition method that is carried out by the speech recognition device illustrated in FIG. 3.

In step S1 of FIG. 4, when the power to the semiconductor integrated circuit device 30B is turned on or after the semiconductor integrated circuit device 30B is reset, the host CPU 61 sends communication data indicating a single question or message, text data indicating a plurality of words or sentences constituting conversion candidates for a reply to that question or message, and a recognition accuracy parameter that is selected according to those words or sentences to the semiconductor integrated circuit device 30B together with a set command.

In step S2, the conversion information setting unit 33 of the semiconductor integrated circuit device 30B receives the text data and the recognition accuracy parameter from the host CPU 61 together with the set command. The conversion information setting unit 33 sets the text data in the conversion list in accordance with the received set command and sets the recognition accuracy parameter in the recognition accuracy adjustment unit 36.

When the new text data is set in the conversion list, in step S3, the standard pattern extracting unit 35 extracts a standard pattern corresponding to at least a part of the words or sentences indicated by the text data that is set in the conversion list, from a speech recognition database containing standard patterns indicating the distribution of frequency components of a plurality of phonemes that are used in a predetermined language. Moreover, in step S4, the recognition accuracy adjustment unit 36 adjusts the range of spread of the standard pattern extracted from the speech recognition database, in accordance with the recognition accuracy parameter.

In step S5, the speech signal synthesizing unit 38 synthesizes a speech signal on the basis of the received communication data, and thus the question or message is emitted from the speech output unit 50. When the user says words as a reply to this, in step S6, the signal processing unit 31 extracts frequency components of the input speech signal by computing the Fourier transform of the speech signal and generates a feature pattern indicating the distribution of the frequency components of the speech signal. Also, the signal processing unit 31 activates a speech detection signal.

When the speech detection signal is activated, in step S7, the match detecting unit 37 detects a match between the feature pattern that is generated from at least a part of the input speech signal and the standard pattern if the feature pattern falls within the range of spread of that standard pattern, and outputs a speech recognition result that specifies a word or sentence with respect to which the match is detected, out of the plurality of words or sentences constituting the conversion candidates.

If a speech recognition result indicating a match between the feature pattern and the standard pattern is not obtained within a predetermined period of time after the activation of the speech detection signal, the host CPU 61 may send a new recognition accuracy parameter of a lower rank to the semiconductor integrated circuit device 30B together with a change command and control the semiconductor integrated circuit device 30B so that match detection is performed again. Thus, if a speech recognition result indicating a match between the feature pattern and the standard pattern is not obtained within the predetermined period of time, match detection can be performed again after relaxing the degree of exactness with respect to the recognition accuracy in speech recognition.

Alternatively, the host CPU 61 may send response data indicating a message such as "Could please say that again?" to the semiconductor integrated circuit device 30B, or may send response data indicating a question that has been restated to achieve greater clarity to the semiconductor integrated circuit device 30B. The speech signal synthesizing unit 38 synthesizes a speech signal on the basis of the response data supplied from the host CPU 61, and the new message or question is emitted from the speech output unit 50.

If a speech recognition result indicating a match between the feature pattern and the standard pattern is obtained within the predetermined period of time after the activation of the speech detection signal, in step S8, the host CPU 61 judges whether or not a series of speech recognition operations have been finished. If the series of speech recognition operations have been finished, the processing is ended. On the other hand, if the series of speech recognition operations have not been finished, the processing proceeds to step S9.

In step S9, the host CPU 61 selects a single response content out of a plurality of response contents in accordance with the speech recognition result output from the semiconductor integrated circuit device 30B, and sends response data indicating the selected response content, text data indicating a plurality of words or sentences constituting conversion candidates for a reply to the selected response content, and a recognition accuracy parameter that is selected according to those words or sentence to the semiconductor integrated circuit device 30B together with a set command. Thus, the processing after step S2 is repeated.

According to this embodiment of the invention, the use of a conversion list that conforms to a speech recognition scenario makes it possible to narrow standard patterns to be compared with a feature pattern of an input speech signal down to a standard pattern corresponding to at least a part of individual words or sentences indicated by text data that is set in the conversion list. Here, the speech recognition scenario means that speech recognition is performed by creating a situation in which a user's reply to a certain question or message is expected to be one of a number of words or sentences.

At that time, the degree of exactness or fuzziness with respect to the recognition accuracy of speech recognition can be set freely in conformity with a speech recognition scenario by sending a command and a recognition accuracy parameter from the host CPU 61 to the semiconductor integrated circuit device 30B. Consequently, it is possible to prevent false recognition by making the recognition accuracy of speech recognition more exact or to improve the recognition rate by relaxing the recognition accuracy of speech recognition.

Next, a specific example of the speech recognition operations of the speech recognition device according to this embodiment will be described. Here, a case where the speech recognition device illustrated in FIG. 3 is applied to a food ticket vending machine in a cafeteria will be described.

A food menu containing a plurality of food names is displayed on the vending machine. It is assumed that characters such as "soba", "udon", "kareh" (curry), and "katsudon" (pork cutlet rice bowl) are displayed on the food menu. In that case, the user's first word is expected to be any of "soba", "udon", "kareh", "katsudon", and the like that are displayed on the food menu.

Thus, when the power to the vending machine is turned on or after the vending machine is reset, the host CPU 61 sends text data indicating the plurality of food names displayed on the food menu to the semiconductor integrated circuit device 30B together with a recognition accuracy parameter and a set command. At this time, the host CPU 61 may set the recognition accuracy parameter in such a manner that if the number of food names displayed on the food menu is larger than a predetermined number, the recognition accuracy is tightened, and if the number of food names displayed on the food menu is smaller than the predetermined number, the recognition accuracy is relaxed.

The conversion information setting unit 33 of the semiconductor integrated circuit device 30B sets the received text data in the conversion list in accordance with the received set command, and sets the received recognition accuracy parameter in the recognition accuracy adjustment unit 36.

In this manner, the conversion list A shown in FIG. 5 is created. FIG. 5 shows numbers corresponding to the respective food names, the food names given in Japanese, and the phonemes contained in the food names given in Roman characters, but the conversion list is only required to contain at least Roman characters or kana characters that can specify the phonemes contained in the food names.

When the conversion list A is created, the standard pattern extracting unit 35 extracts, from the speech recognition database, standard patterns corresponding the respective phonemes /s•o/, /u/, /k•a/, /k•a/, and the like contained in the first syllables "so", "u", "ka", "ka", and the like of the food names "soba", "udon", "kareh", "katsudon", and the like contained in the conversion list A. Also, the recognition accuracy adjustment unit 36 adjusts the ranges of spread of the standard patterns extracted from the speech recognition database, in accordance with the recognition accuracy parameter.

Moreover, the host CPU 61 sends communication data indicating a question or message "Which item would you like? Please say the food name" to the semiconductor integrated circuit device 30B. The speech signal synthesizing unit 38 of the semiconductor integrated circuit device 30B synthesizes a speech signal on the basis of this communication data and outputs the speech signal to the D/A converter 40. The D/A converter 40 converts the digital speech signal into an analog speech signal and outputs the analog speech signal to the speech output unit 50. Thus, the question or message "Which item would you like? Please say the food name" is emitted from the speech output unit 50.

If the user says "Katsudon wo kudasai" (Katsudon, please), looking at the displayed food menu, in response to the question or message emitted from the speech output unit 50, the signal processing unit 31 generates a feature pattern indicating the distribution of frequency components with respect to each of the phonemes /k•a•t•u•d•o•N . . . /.

The match detecting unit 37 compares the feature pattern of the first phoneme /k/ of the first syllable that is generated by the signal processing unit 31 with the standard patterns of the first phonemes /s/, /u/, /k/, /k/, and the like of the first syllables that are extracted from the speech recognition database, and thereby detects a match with respect to the phoneme /k/.

If a phoneme with respect to which a match is detected represents a consonant, the match detecting unit 37 further makes a comparison with respect to the second phoneme of the first syllable. The match detecting unit 37 compares the feature pattern of the second phoneme /a/ of the first syllable that is generated by the signal processing unit 31 with the standard patterns of the second phonemes /o/, /a/, /a/, and the like of the first syllable that are extracted from the speech recognition database, and thereby detects a match with respect to the phoneme /a/.

Thus, a match is detected with respect to the syllable "ka". If the match is detected with respect to only one food name, a speech recognition result is obtained here. However, since the conversion list contains the food name "kareh" and the food name "katsudon", it is not possible to recognize which applies. In such a case, the match detecting unit 37 expands the range of syllables with respect to which match detection is to be performed.

That is to say, the match detecting unit 37 outputs a signal for requesting extraction of standard patterns corresponding to the second syllables of the above-described food names contained in the conversion list to the standard pattern extracting unit 35. Thus, the standard pattern extracting unit 35 extracts, from the speech recognition database, standard patterns indicating the distribution of frequency components with respect to the phonemes /r•e/ and /t•u/ contained in the second syllables "re" and "tsu" of the food names "kareh" and "katsudon" contained in the conversion list. Moreover, the recognition accuracy adjustment unit 36 adjusts the ranges of spread of the standard patterns that are extracted from the speech recognition database, in accordance with the recognition accuracy parameter.

The match detecting unit 37 compares the feature pattern of the first phoneme /t/ of the second syllable that is generated by the signal processing unit 31 with the standard patterns of the first phonemes /r/ and /t/ of the second syllables that are extracted from the speech recognition database, thereby detecting a match with respect to the phoneme /t/.

Furthermore, the match detecting unit 37 compares the feature pattern of the second phoneme /u/ of the second syllable that is generated by the signal processing unit 31 with the standard patterns of the second phonemes /e/ and /u/ of the second syllables that are extracted from the speech recognition database, thereby detecting a match with respect to the phoneme /u/.

Thus, a match is detected with respect to the syllable "tu". In the case where another food name having the first syllable "ka" and the second syllable "tsu" is present, the match detecting unit 37 can further expand the range of syllables with respect to which match detection is to be performed. The match detecting unit 37 outputs a speech recognition result that specifies the food name "katsudon" having the first syllable "ka" and the second syllable "tsu", with respect to which the match is detected, to the host CPU 61.

The information that specifies the food name "katsudon" corresponds to the number shown in FIG. 5, the food name "katsudon" or a part thereof "katsu" given in Japanese, the phonemes /katudoN/ contained in the food name or a part thereof /katu/ given in Roman characters, or the like. Thus, the host CPU 61 can recognize the food name "katsudon" corresponding to at least a part of the input speech signal. Thus, the host CPU 61 can recognize the food name "katsudon" corresponding to at least a part of the input speech signal.

When the first cycle of the speech recognition operations is finished in this manner, the host CPU 61 starts a second cycle of the speech recognition operations. The host CPU 61 selects one suitable response content out of the plurality of response contents indicated by the response data stored in the storing unit 62, in accordance with the received speech recognition result, and sends response data indicating the selected response content and text data indicating a plurality of conversion candidates for a reply to the selected response content to the semiconductor integrated circuit device 30B together with a recognition accuracy parameter and a set command.

The conversion information setting unit 33 of the semiconductor integrated circuit device 30B deletes all the current text data from the conversion list in accordance with the received set command, then sets the received text data in the conversion list, and sets the received recognition accuracy parameter in the recognition accuracy adjustment unit 36.

For example, the host CPU 61 supplies response data indicating a question "How many?" to the speech signal synthesizing unit 38. In that case, the user's first word to this question is expected to be any of a plurality of replies such as "hitotsu" (one), "hutatsu" (two), and "mittsu" (three). Thus, the host CPU 61 sends text data indicating the plurality of replies such as "hitotsu", "hutatsu", and "mittsu" to the semiconductor integrated circuit device 30B together with a recognition accuracy parameter and a set command.

In this manner, the conversion list B shown in FIG. 6 is created. When the conversion list B is created, the standard pattern extracting unit 35 extracts, from the speech recognition database, standard patterns indicating the distribution of frequency components with respect to the phonemes /h•i/, /h•u/, /m•i/, and the like contained in the first syllables "hi", "hu", "mi", and the like of the words "hitotsu", "hutatsu", "mittsu", and the like that are indicated by the text data contained in the conversion list B. Furthermore, the recognition accuracy adjustment unit 36 adjusts the ranges of spread of the standard patterns extracted from the speech recognition database, in accordance with the recognition accuracy parameter.

The speech signal synthesizing unit 38 synthesizes a speech signal on the basis of the response data supplied from the host CPU 61 and outputs the speech signal to the D/A converter 40. The D/A converter 40 converts the digital speech signal into an analog speech signal and outputs the analog speech signal to the speech output unit 50. Thus, the question "How many?" is emitted from the speech output unit 50 to the user.

If the user says "Hitotsu desu" (One, please) in response to the question emitted from the speech output unit 50, the signal processing unit 31 generates a feature pattern indicating the distribution of frequency components with respect to each of the phonemes /h•i•t•o•t•u . . . /.

The match detecting unit 37 compares the feature pattern of the first phoneme /h/ of the first syllable that is generated by the signal processing unit 31 with the standard patterns of the first phonemes /h/, /h/, /m/, and the like of the first syllables that are extracted from the speech recognition database, thereby detecting a match with respect to the phoneme /h/.

If the phoneme with respect to which a match is detected represents a consonant, the match detecting unit 37 further compares the feature pattern of the second phoneme /i/ of the first syllable that is generated by the signal processing unit 31 with the standard patterns of the second phonemes /i/, /u/, /i/, and the like of the first syllables that are extracted from the speech recognition database, thereby detecting a match with respect to the phoneme /i/.

Thus, a match is detected with respect to the syllable "hi". The match detecting unit 37 outputs a speech recognition result that specifies the word "hitotsu" having the syllable "hi", with respect to which the match is detected, as the first syllable of that word to the host CPU 61. Thus, the host CPU 61 can recognize the word "hitotsu" corresponding to at least a part of the input speech signal.

Then, the host CPU 61 supplies response data indicating a message "Please insert XXX yen" to the speech signal synthesizing unit 38. The speech signal synthesizing unit 38 synthesizes a speech signal on the basis of the response data supplied from the host CPU 61 and outputs the speech signal to the D/A converter 40. The D/A converter 40 converts the digital speech signal into an analog speech signal and outputs the analog speech signal to the speech output unit 50. Thus, the message "Please insert XXX yen" is emitted from the speech output unit 50 to the user.

In the foregoing descriptions, specific examples in which the invention is applied to a vending machine have been described. However, it should be understood that the invention is not limited to the embodiments that have been described above and is applicable to common electronic devices, and many variations can be made by those skilled in the art without departing from the technical idea of the invention.

What is claimed is:

1. A semiconductor integrated circuit device comprising:
a speech recognition database storing unit that stores a speech recognition database containing standard patterns indicating distribution of frequency components of a plurality of phonemes that are used in a predetermined language;
a conversion list storing unit that stores a speech recognition conversion list;
a conversion candidate setting unit that receives text data indicating words or sentences together with a command, and updates the speech recognition database, in accordance with the command, by one of: (i) newly-setting all of the received text data in a conversion list corresponding to the command in the speech recognition database, (ii) adding only a part of the received text data in the conversion list as one or more new entries, the part of the received text data being less than all of the received text data, and (iii) deleting all or the part of the received text from the conversion list, wherein the type of conversion list update conforms to the command;
a standard pattern extracting unit that extracts, from the speech recognition database, a standard pattern corresponding to at least a part of the words or sentences indicated by the text data that is in the conversion list;
a signal processing unit that extracts frequency components of an input speech signal; and
a match detecting unit that detects a match between the feature pattern generated from at least a part of the speech signal and the standard pattern extracted from the speech recognition database, and outputs a speech recognition result that specifies a word or sentence with respect to which a match is detected out of a plurality of words or sentences constituting conversion candidates.

2. The semiconductor integrated circuit device according to claim 1, further comprising: a speech signal synthesizing unit that receives response data indicating a response content with respect to the speech recognition result and synthesizes an output speech signal on the basis of the response data.

3. The semiconductor integrated circuit device according to claim 1, wherein when a level of the speech signal exceeds a predetermined value, the signal processing unit activates a speech detection signal.

4. A speech recognition device comprising:
the semiconductor integrated circuit device according to claim 1; and
a control unit that sends the text data indicating the words or sentences to the semiconductor integrated circuit device together with the command.

5. A speech recognition device comprising:
the semiconductor integrated circuit device according to claim 2; and
a control unit that receives the speech recognition result, and sends the response data and the text data indicating the words or sentences to the semiconductor integrated circuit device together with the command.

6. A speech recognition device comprising:
the semiconductor integrated circuit device according to claim 3; and
a control unit that, if a speech recognition result indicating a match between the feature pattern and the standard pattern is not obtained within a predetermined period of time after activation of the speech detection signal, sends text data to be added to the conversion list to the semiconductor integrated circuit device together with the command, and controls the semiconductor integrated circuit device so that match detection is performed.

7. A method for speech recognition, comprising:
(a) receiving text data indicating words or sentences together with a command;
(b) updating a speech recognition database, in accordance with the command, by one of: (i) newly-setting all of the received text data in a conversion list corresponding to the command in the speech recognition database, (ii) adding only a part of the received text data in the conversion list as one or more new entries, the part of the received text data being less than all of the received text data, and (iii) deleting all or the part of the received text from the conversion list, wherein the speech recognition database contains standard patterns indicating distribution of frequency components of a plurality of phonemes that are used in a predetermined language, and the type of conversion list update conforms to the command;
(c) extracting, from the speech recognition database, a standard pattern corresponding to at least a part of the words or sentences indicated by the text data that is in the updated conversion list;
(d) extracting frequency components of an input speech signal;
(e) detecting a match between the feature pattern generated from at least a part of the speech signal and the standard pattern extracted from the speech recognition database; and
(f) outputting a speech recognition result that specifies a word or sentence with respect to which a match is detected out of a plurality of words or sentences constituting conversion candidates.

8. A semiconductor integrated circuit device comprising:
a speech recognition database storing unit that stores a speech recognition database containing standard patterns indicating distribution of frequency components of a plurality of phonemes that are used in a predetermined language;
a conversion list storing unit that stores the conversion list;
a conversion information setting unit that receives text data indicating words or sentences constituting conversion candidates and a recognition accuracy parameter indicating the degree of exactness or fuzziness with respect to recognition accuracy that is applied when the words or sentences constituting the conversion candidates are recognized together with a command, and updates the speech recognition database by one of: (i) newly-setting all of the received text data in a conversion list corresponding to the command with the recognition accuracy parameter in the speech recognition database, (ii) adding only a part of the received text data in the conversion list as one or more new entries, the part of the received text data being less than all of the received text data, and (iii) deleting all or the part of the received text from the conversion list, wherein the type of conversion list update conforms to the command;
a standard pattern extracting unit that extracts, from the speech recognition database, a standard pattern corresponding to at least a part of the words or sentences indicated by the text data that is in the conversion list;
a recognition accuracy adjustment unit that adjusts a range of spread of the standard pattern extracted from the speech recognition database, in accordance with the recognition accuracy parameter;
a signal processing unit that extracts frequency components of an input speech signal; and
a match detecting unit that detects a match between the feature pattern generated from at least a part of the speech signal and the standard pattern if the feature pattern falls within the range of spread of the standard pattern, and outputs a speech recognition result that specifies a word or sentence with respect to which a match is detected out of the words or sentences constituting the conversion candidates.

9. The semiconductor integrated circuit device according to claim 8, further comprising: a speech signal synthesizing unit that receives response data indicating a response content with respect to the speech recognition result and synthesizes an output speech signal on the basis of the response data.

10. The semiconductor integrated circuit device according to claim 8, wherein when a level of the speech signal exceeds a predetermined value, the signal processing unit activates a speech detection signal.

11. A speech recognition device comprising:
the semiconductor integrated circuit device according to claim 8; and
a control unit that sends the text data indicating the words or sentences constituting the conversion candidates and the recognition accuracy parameter to the semiconductor integrated circuit device together with the command.

12. A speech recognition device comprising:
the semiconductor integrated circuit device according to claim 9; and
a control unit that selects the response content out of a plurality of response contents in accordance with the speech recognition result output from the semiconductor integrated circuit device, and sends the response data indicating the selected response content, the text data indicating the words or sentences constituting the conversion candidates for a reply to the response content, and the recognition accuracy parameter that is selected according to the words or sentences constituting the conversion candidates to the semiconductor integrated circuit device together with the command.

13. A speech recognition device comprising:
the semiconductor integrated circuit device according to claim 10; and
a control unit that, if the speech recognition result indicating a match between the feature pattern and the standard pattern is not obtained within a predetermined period of time after activation of the speech detection signal, sends a new recognition accuracy parameter to the semiconductor integrated circuit device together with a new command, and controls the semiconductor integrated circuit device so that match detection is performed.

14. A method for speech recognition, comprising:
(a) receiving text data indicating words or sentences constituting conversion candidates and a recognition accuracy parameter indicating a degree of exactness or fuzziness with respect to recognition accuracy that is applied when the words or sentences constituting the conversion candidates are recognized together with a command;
(b) updating a speech recognition database, in accordance with the command, by one of: (i) newly-setting all of the received text data in a conversion list corresponding to the command in the speech recognition database, (ii) adding only a part of the received text data in the conversion list as one or more new entries, the part of the received text data being less than all of the received text data, and (iii) deleting all or the part of the received text from the conversion list, wherein the speech recognition database contains standard patterns indicating distribution of frequency components of a plurality of phonemes that are used in a predetermined language, and the type of conversion list update conforms to the command;

(c) extracting, from the speech recognition database, a standard pattern corresponding to at least a part of the words or sentences indicated by the text data that is in the updated conversion list;

(d) adjusting a range of spread of the standard pattern extracted from the speech recognition database, in accordance with the received recognition accuracy parameter;

(e) extracting frequency components of an input speech signal;

(f) detecting a match between the feature pattern generated from at least a part of the speech signal and the standard pattern if the feature pattern falls within the range of spread of the extracted standard pattern; and (g) outputting a speech recognition result that specifies a word or sentence with respect to which a match is detected out of the words or sentences constituting the conversion candidates.

15. The semiconductor integrated circuit device according to claim 1, wherein the signal processing unit extracts frequency components of the input speech signal by computing a Fourier transform of the speech signal and generates a feature pattern indicating distribution of the frequency components of the speech signal.

16. The semiconductor integrated circuit device according to claim 8, wherein the signal processing unit extracts frequency components of the input speech signal by computing a Fourier transform of the speech signal and generates a feature pattern indicating distribution of the frequency components of the speech signal.

17. The semiconductor integrated circuit device according to claim 1, wherein the recognition accuracy parameter is set based on a determination of whether the number of options in the conversion list are greater than or less than a predetermined number.

18. The semiconductor integrated circuit device according to claim 8, wherein the recognition accuracy parameter is set based on a determination of whether the number of options in the conversion list are less than a predetermined number.

19. The semiconductor integrated circuit device according to claim 8, wherein the recognition accuracy parameter is set based on a determination of whether the number of options in the conversion list are greater than a first predetermined number or less than a second predetermined number.

20. The semiconductor integrated circuit device according to claim 1, wherein the speech recognition database storing unit stores a plurality of speech recognition databases including the speech recognition database, the plurality of speech recognition databases being generated on the basis of speech signals obtained by recording speech spoken by speakers belonging to a plurality of groups classified by age and/or gender.

21. The semiconductor integrated circuit device according to claim 1, wherein
the updating of the speech recognition database includes updating the speech recognition database by setting the received text data in the conversion list of the speech recognition database, and
the conversion list associates words and/or sentences from the received text data with the command.

22. The semiconductor integrated circuit device according to claim 1, wherein
the updating of the speech recognition database includes updating option information of the speech recognition database by setting the received text data in the conversion list of the speech recognition database, and
the conversion list associates words and/or sentences from the received text data with the command such that the results of future speech recognition processing is performed based on the received text data and associated command.

23. The semiconductor integrated circuit device according to claim 1, wherein if a speech recognition result indicating a match between the feature pattern and the standard pattern is not obtained within a predetermined period of time after the activation of the speech detection signal, a host CPU may send text data to be added to the conversion list to the semiconductor integrated circuit device together with an add command and control the semiconductor integrated circuit device so that match detection is performed again.

24. The semiconductor integrated circuit device according to claim 1, wherein if any of a number of items sells out during the speech recognition operations, a host CPU sends text data indicating the name of the item that has sold out to the semiconductor integrated circuit device together with a delete command.

* * * * *